WILLIAM F. KETCHUM.
Improvement in Harvesters.
No. 4,672. Reissued Dec. 12, 1871.
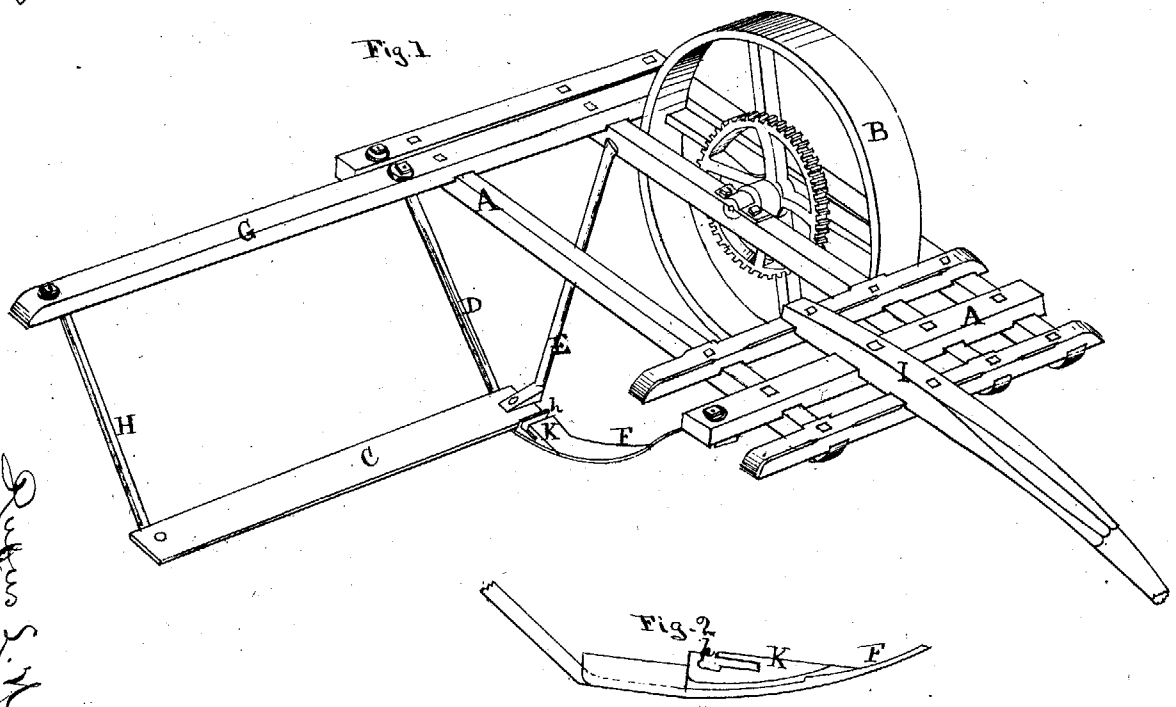
Witnesses
H. Knight
R. Luck
Rufus L. Howard
Assd. Ketchum Harvesting Co.
(Seal)
A. McCallum
Atty.
N. PETERS, PHOTO-LITHOGRAPHER, WASHINGTON, D.C.

UNITED STATES PATENT OFFICE.

KETCHUM HARVESTING MACHINE COMPANY, ASSIGNEE, BY MESNE ASSIGNMENTS, OF WILLIAM F. KETCHUM, DECEASED, OF BUFFALO, N. Y.

IMPROVEMENT IN HARVESTERS.

Specification forming part of Letters Patent No. 8,724, dated February 10, 1852; Reissue No. 259, dated February 28, 1854; Reissue No. 466, dated June 2, 1857; extended seven years; Reissue No. 3,033, dated July 14, 1868; Reissue No. 4,672, dated December 12, 1871.

DIVISION A.

*To all whom it may concern:*

Be it known that WILLIAM F. KETCHUM, deceased, late of the city of Buffalo, in the county of Erie and State of New York, in his life-time invented certain new and useful Improvements in Grass and Grain Cutting Machines, of which the following is a specification:

The invention relates to improvements in that class of machines which may be used either for mowing grass or harvesting grain, and for which a patent was granted to said WILLIAM F. KETCHUM, July 10, 1847.

The invention consists in a new and improved shoe for the support of the end of the finger-bar, which is provided with a slot, forming at once a support and passage for the cutting apparatus and a finger against which to cut, and said slot being provided with a shield or cover, it also protects the end of the cutting apparatus against clogging, by keeping the grass or grain out of the slot through which the cutters slide.

It also consists in extending the shoe upward and forward to the front part of the frame, and firmly securing it thereto, so as to communicate the draft directly to the heel of the cutter-bar, and give it additional strength and support, and enable the heel of the finger-bar to slide or pass over the mown grass or other obstruction which may lie in its path.

In the accompanying drawing, Figure 1 is a perspective view of such portions of a machine as are necessary to show the improvements; Fig. 2, a portion of the same, showing the shoe attachment at the heel of the finger-bar.

A represents the main frame, composed of strong longitudinal bars, united at each end by cross-bars firmly bolted thereto. This frame is supported by a wheel, B, placed in the space between the longitudinal and the cross bars. This wheel is the main wheel of the machine, upon which it travels, and by the revolution of which, through proper gearing, the cutters are made to operate.

C is the finger-bar for supporting the cutters. It is placed close to the ground, at a convenient distance from the driving-wheel, and in a plane nearly vertical to and parallel with the line of the axle of the driving-wheel. D and E are arms or braces, extending from the main frame at points in rear of the axle to the heel of the finger-bar, for the support of the latter.

G represents a cross-bar in rear of the wheel, extending outward from the main frame above and behind and parallel with the finger-bar. H is an arm or brace, extending from the outer end of this bar G to the outer end of the finger-bar, for the support of the latter.

I represents the tongue or draft-pole, secured to the forward cross-bars of the frame at a point in a line intermediate between the heel of the finger-bar and the driving-wheel.

F K represent a shoe secured to the heel of the finger-bar, and projected forward and upward therefrom, so as to tread down the grass or grain where the end of the cutter-bar is working, and prevent it from falling on or being caught in the moving joint. It also enables the heel of the finger-bar to pass or slide over obstructions and over the mown grass or grain which may lie in its path, and, being extended upward to the forward part of the frame and firmly bolted thereto, it gives support to the finger-bar, and communicates the draft directly thereto. The rear end of this shoe is cut with a slot, *h*, of particular form, in which the heel of the cutters works back and forth, by which it is protected from the falling grass or grain, as hereinbefore set forth.

What is claimed as the invention is—

1. A shoe, F K, for the support of the finger-bar, when constructed so as to act as a shield or cover for the protection of the cutting apparatus against clogging, and as a finger against which to cut, and when provided with a slot, *h*, to act as a guideway and passage for the cutter bar and blade, substantially as set forth.

2. The shoe F K, projected forward and upward from the heel of the finger-bar, and connected with the frame, substantially as and for the purposes specified.

R. L. HOWARD,
*Prest. K. H. M. Co.*

Witnesses:
H. U. SOPER,
GEO. H. HUGHSON.